US007054483B2

(12) United States Patent
Poynter

(10) Patent No.: US 7,054,483 B2
(45) Date of Patent: May 30, 2006

(54) METHODS FOR SELECTING HIGH VISUAL CONTRAST COLORS IN USER-INTERFACE DESIGN

(75) Inventor: William Douglas Poynter, Duluth, GA (US)

(73) Assignee: NCR Corporation, Dayton, OH (US)

( * ) Notice: Subject to any disclaimer, the term of this patent is extended or adjusted under 35 U.S.C. 154(b) by 796 days.

(21) Appl. No.: 10/097,835

(22) Filed: Mar. 15, 2002

(65) Prior Publication Data

US 2003/0174866 A1 Sep. 18, 2003

(51) Int. Cl.
*G06K 9/00* (2006.01)
*G06K 9/68* (2006.01)

(52) U.S. Cl. ........................................ 382/162; 382/218

(58) Field of Classification Search ................. 382/162, 382/163, 165, 218; 345/589, 592, 603, 636; 358/452, 504, 509, 530, 537; 715/513
See application file for complete search history.

(56) References Cited

U.S. PATENT DOCUMENTS 4,924,413 A * 5/1990 Suwannukul ............... 345/603
5,315,416 A * 5/1994 Taniuchi et al. ............ 358/537
5,363,212 A * 11/1994 Taniuchi et al. ............ 358/452
5,630,037 A * 5/1997 Schindler .................... 345/592
6,104,359 A * 8/2000 Endres et al. ............... 345/589
6,195,078 B1 * 2/2001 Dinwiddie et al. ......... 345/636
6,243,070 B1 * 6/2001 Hill et al. .................... 345/589
6,434,269 B1 * 8/2002 Hamburg .................... 382/163
6,792,575 B1 * 9/2004 Samaniego et al. ......... 715/513

OTHER PUBLICATIONS

Niederst, J., “Web Design in a Nutshell”, Sebastopol, Ca., O'Reilly & Assoc., 1999, p. 30.
“Contrast Sensitivity and Image Recognition: Applications to the Design of Visual Displays”, Technology and Applications, vol. 13, No. 1, 1992.

* cited by examiner

*Primary Examiner*—Andrew W. Johns
*Assistant Examiner*—Amir Alavi
(74) *Attorney, Agent, or Firm*—Lowe Hauptman Gilman & Berner, LLP; Paul W. Martin

(57) ABSTRACT

The invention relates to assessing the level of visual contrast between foreground and background in visually presented information, and more particularly, to a method and apparatus for determining whether a given set of foreground and background colors creates sufficient visual contrast to ensure legibility for the general population, as well as for individuals with visual disabilities, including color blindness/deficiency.

6 Claims, 4 Drawing Sheets

(3 of 4 Drawing Sheet(s) Filed in Color)

METHODS FOR SELECTING HIGH VISUAL CONTRAST COLORS IN USER-INTERFACE DESIGN

FIELD OF THE INVENTION

The present invention generally relates to assessing the level of visual contrast between foreground and background in visually presented information, and more particularly, to a method and apparatus for determining whether a given set of foreground and background colors creates sufficient visual contrast to ensure legibility for the general population, as well as for individuals with visual disabilities, including color blindness/deficiency.

BACKGROUND OF THE INVENTION

Luminance contrast and color contrast are key determinants of how easily information on a computer display can be read. FIG. 1 illustrates the visual effects of luminance and color contrast on image clarity and legibility. High levels of contrast produce high levels of image clarity and legibility.

Normal aging has a detrimental effect on visual contrast sensitivity, such that displayed information which is legible to an individual in his/her twenties may not be legible to an individual in his/her forties and older. In addition to the effects of normal aging, there are many medical and genetic factors, such as color blindness and color deficiency, that affect contrast sensitivity and overall visual acuity. As many as 8% of men and 1% of women have some form of color blindness, as disclosed by the American Optometric Association (http://www.aoanet.org/cvc-color-deficiency.html).

Furthermore, § 508 of the Rehabilitation Act of 1973, as amended (29 U.S.C. 794*d*), requires that when Federal agencies develop, procure, maintain, or use electronic and information technology, Federal employees with disabilities (including visual disabilities) have access to and use of information and data that is comparable to the access and use by Federal employees who are not individuals with disabilities, unless an undue burden would be imposed on the agency.

Companies developing graphical user-interfaces for products sold to the government as well as retail markets have a keen interest in designing these user-interfaces to ensure that they are legible to the general population, including those with visual disabilities.

Presently, graphical user-interface design relies primarily on the subjective judgment of the designer as to whether the degree of visual contrast between text (or other foreground content) and background is sufficient to allow most individuals to read the display content. Various tools are available which allow the designer to choose among Web-Safe colors (Niederst, J., Web Design in a Nutshell. Sebastopol, Calif.: O'Reilly & Assoc., 1999, p. 30), a set of 216 colors so called because they utilize red, green, and blue primary combinations that are less likely to produce dithering on any given display, and view the chosen colors in combination (one such example is VisiBone's Webmaster's Color Laboratory). However, these tools still leave to the subjective judgment of the designer the assessment of whether a given set of foreground and background colors creates sufficient visual contrast, a particularly difficult if not impossible task for a normal sighted designer to do for the portion of the population with visual disabilities. Thus there is a pressing need for a method to objectively evaluate the legibility of foreground/background color combinations, that will consider both luminance and color contrast, and which will address the needs of the visually disabled (especially color-deficient) portions of the population.

SUMMARY OF THE INVENTION

It is, therefore, an objective of the present invention to provide an objective evaluation of whether the visual contrast of selected foreground and background colors is sufficient to ensure legibility for the general population, including individuals with visual disabilities.

It is a further objective of the present invention to receive as input a foreground or background color, and identify background or foreground colors, respectively, whose visual contrast with the first color is above a certain contrast minimum.

Luminance contrast is defined as the luminance of the brighter of foreground or background, divided by the luminance of the dimmer of foreground or background. As a general guideline, a minimum luminance contrast value of 3.0 should be employed, although both the size of images, color contrast, age of observer, and other factors interact to determine the threshold luminance contrast required for legibility (Poynter, D., "Contrast Sensitivity and Image Reception: Applications to the Design of Visual Displays," in Displays: Technology and Applications, Vol. 13, No. 1, 1992).

Color contrast can be used to bolster the legibility-enhancing effects of luminance contrast, but it should not be used as the sole parameter to define contrast (i.e. a minimum luminance contrast of 3.0 should always be present).

These and other objects of the present invention are achieved by a method which provides an objective evaluation of the legibility of color selections for foreground content and background of visual displays, in terms of the presentation of adequate visual contrast. A foreground color is received as input for the foreground content. A background color is received as input for the background. The visual contrast between the foreground color and the background color is calculated. The results of the calculation of the visual contrast of the inputted foreground and background colors are displayed in the form of an objective evaluation of the legibility of the inputted color combination.

These and other objects of the present invention are achieved by a second method which provides an objective evaluation of the legibility of color selections for foreground content and background of visual displays, in terms of the presentation of adequate visual contrast. A foreground color or background color is received as input. A palette of colors is received as input. A number value for each of at least one measure of visual contrast, representing the minimum acceptable value for each of the respective measures of visual contrast is received as input. The inputted foreground or background color is compared to each color of the color palette. At least one color of the palette of colors whose value for each measure of visual contrast is greater than the respective minimum acceptable value for measures of visual contrast, if such a color is present in the palette, is identified. The at least one color identified in the palette of colors whose values for its measures of visual contrast are greater than the at least one respective inputted minimum acceptable value for measures of visual contrast, identified in the previous step, if any such colors are present in the palette, is highlighted for the user. If no such colors are present in the palette, output is provided indicating there is no color in the palette of colors that has values for its measures of visual contrast greater than the at least one respective inputted minimum acceptable values.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present invention is illustrated by way of example, and not by limitation, in the figures of the accompanying drawings, wherein elements having the same reference numeral designations represent like elements throughout and wherein.

GLOSSARY OF TERMS USED IN THE INVENTION

Figure 1:
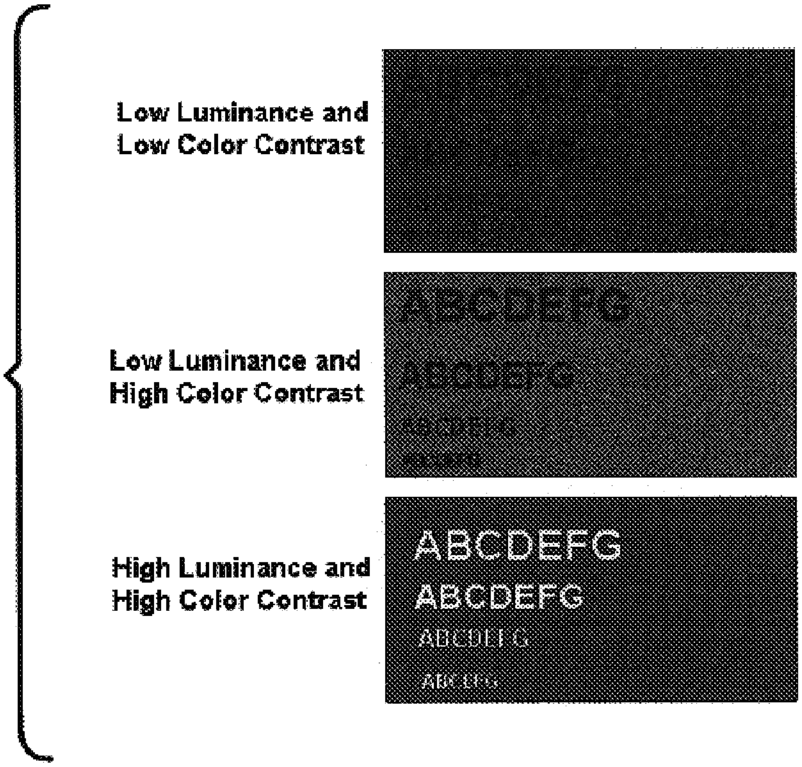
FIG. 1 illustrates the visual effects of luminance and color contrast on image clarity and legibility.
Figure 2:
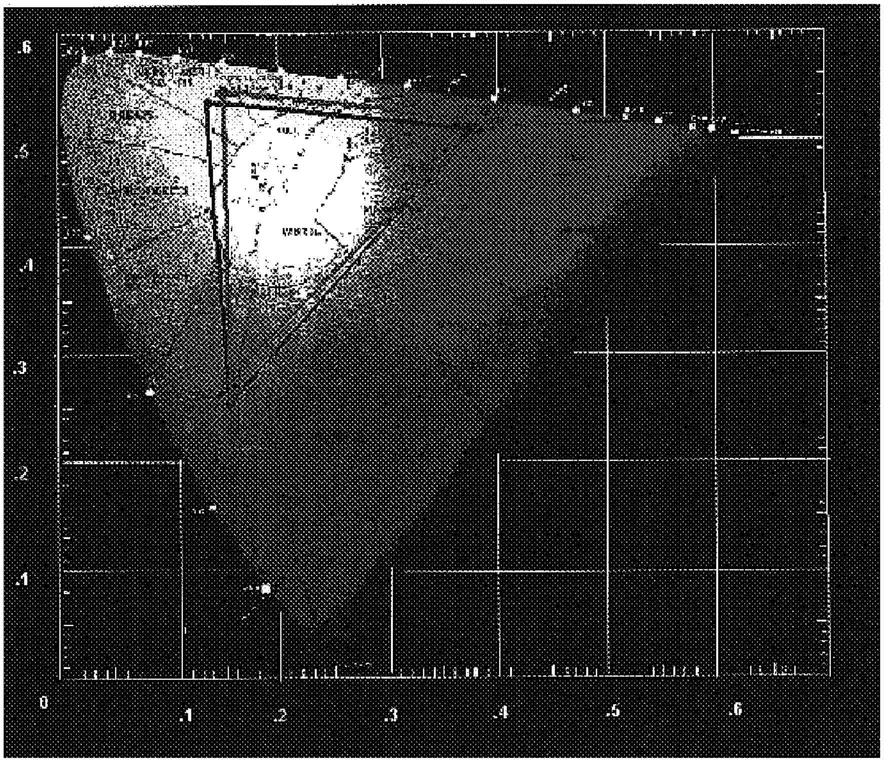
FIG. 2 is copy of the C.I.E. u'v' color plane.

The following definitions relate to these terms as they are used herein:

"Color contrast"—The color contrast between two colors is defined herein as the straight-line distance between the points in the 1976 C.I.E u'v' color plane that represent the foreground and background colors for given user-selected RGB combinations, as illustrated in FIG. 2.

"Luminance"—A measure of the intensity of light illuminating a surface of a given area, corrected for the sensitivity of the eye to the various wavelengths of light composing the source. Luminance is a correlate of the human perceptual experience of the brightness of a light source.

"Luminance contrast"—The luminance contrast between two colors is defined herein as the luminance of the brighter of the two colors divided by the luminance of the dimmer of the two colors.

"Protanopia"—A form of color-deficiency characterized by defective perception of red and confusion of red with green or bluish green. Protanopia occurs when an individual is missing the red-photosensitive pigment in the retina of the eye.

"Protanope"—An individual suffering from protanopia.

"Deuteranopia"—A form of color-deficiency characterized by defective perception of green and confusion of green with red or bluish red. Protanopia occurs when an individual is missing the green-photosensitive pigment in the retina of the eye.

"Deuteranope"—An individual suffering from deuteranopia.

"Tritanopia"—A form of color-deficiency characterized by defective perception of blue and confusion of blues and yellow. Tritanopia occurs when an individual is missing the blue-photosensitive pigment in the retina of the eye. This form of color-deficiency is extremely rare.

"Tritanope"—An individual suffering from tritanopia.

"Web-Safe"—Web-Safe colors are those produced from red, green, and blue primary combinations that are less likely to produce dithering on any given display.

BEST MODE OF CARRYING OUT THE INVENTION

A method of providing an objective evaluation of the legibility of foreground and background color combinations is described in terms of the presentation of adequate visual contrast. In the following description, for purposes of explanation, numerous specific details are set forth in order to provide a thorough understanding of the present invention. It will be apparent, however, that the present invention may be practiced without these specific details.

The best mode conceived of carrying out the present invention is through a software tool. However, the present patent application is an example only, and does not limit the scope of the invention. The present invention could alternatively be built into hardware without effecting substantive change.

Figure 3:
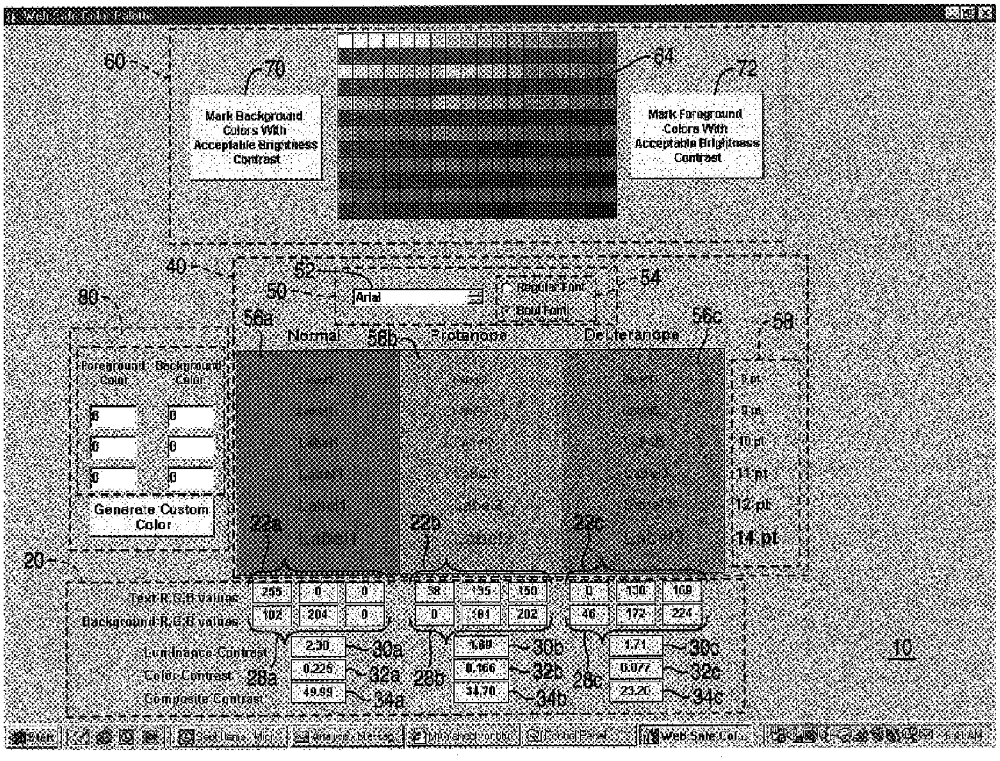
FIG. 3 illustrates a possible graphical user interface (GUI) for the present invention.

FIG. 3 illustrates an exemplary graphical user-interface (GUI), generally indicated at 10, for the present invention, as displayed on the screen of a display device. The GUI includes four main areas: numerical data display area 20, located at the bottom of the screen; graphical presentation display area 40, located in the middle of the screen; palette display area 60, located at the top of the screen; and color generation area 80, located to the left of graphical presentation display area 40.

Numerical data display area 20, located at the bottom of the screen, includes the various displays of numerical data relating to a foreground color selected, a background color selected, and calculated visual contrasts between them.

Foreground RGB value boxes 22*a*–22*c* display the Red, Green, and Blue (RGB) software values of the foreground color, while background RGB value boxes 28*a*–28*c* display the RGB software values of the background color. The foreground RGB value boxes 22*a*–22*c* and the background RGB value boxes 28*a*–28*c* display the RGB software values for the foreground and background colors as they would appear to a normally sighted individual, a protanope, and a deuteranope, respectively.

Luminance contrast boxes 30*a*–30*c* display the luminance contrast between the foreground and background colors as it would appear to a normally sighted individual, a protanope, and a deuteranope, respectively. Color contrast boxes 32*a*–32*c* display the color contrast between the foreground and background colors as it would appear to a normally sighted individual, a protanope, and a deuteranope, respectively.

Composite contrast is used herein as a weighted average of luminance contrast and color contrast, normalized between 0 and 100. Composite contrast can be calculated in a variety of ways, depending upon the intended use of the application. For some applications, color contrast might be deemed more important than luminance contrast; in such cases, it would be given a greater weight in the calculation of the composite index to better represent the human perception. In other cases, luminance contrast might be deemed more important than color contrast, in which case luminance contrast might be given a greater weight. In still other cases, both luminance and color contrast might be given equal weighting. The default setting is for luminance contrast to have greater weight than color contrast, because luminance contrast has a greater influence on text legibility than color contrast, especially for relatively small text. The weightings can be changed by the user.

Composite contrast boxes 34a–34c display the composite contrast between the foreground and background colors as it would appear to a normally sighted individual, a protanope, and a deuteranope, respectively. Alternatively, luminance contrast boxes 30a–30c, color contrast boxes 32a–32c, and composite contrast boxes 34a–34 could display the luminance contrast, color contrast, and composite contrast, respectively, between the foreground and background colors as they would appear through any other visual perception (such as that of a totally color-blind individual, an individual with above-average visual perception, an animal such as a chimpanzee or dog, a human under less than optimal light conditions, etc.).

Graphical presentation display area 40, located in the middle of the screen, includes the graphical presentation of how foreground content of the foreground color selected appears against the background color selected, and the controls for modifying the non-color aspects of the appearance of the foreground content.

Graphical control area 50, located at the top of graphical presentation display area 40, includes controls for modifying the non-color aspects of the appearance of the foreground content. In the preferred embodiment of the present invention this includes a scrolling menu 52 for selecting font face, and a selection of radio buttons 54 for selecting font type. Graphical control area 50 could include any other controls for modifying non-color aspects of the appearance of the foreground content, such as effects (shadow, emboss, engrave, etc.), font size, etc., without affecting the present invention.

Each of the three foreground-on-background boxes 56a–56c below the palette display foreground content whose color is that of the foreground color selected, on a solid background whose color is that of the background color selected. The foreground content uses text; alternatively the foreground content could include pictures, symbols, shapes, or outlines.

The text displayed in foreground-on-background boxes 56a–56c is further modified by the settings in the graphical control area 50. The three foreground-on-background boxes 56a–56c display the foreground content on the background as it would appear to a normally sighted individual, a protanope, and a deuteranope, respectively. Alternatively, foreground-on-background boxes could display the foreground content on the background as it would appear through any other visual perception (such as that of a totally color-blind individual, an individual with above-average visual perception, an animal such as a chimpanzee or dog, a human under less than optimal light conditions, etc.).

Font size column 58, located to the right of the foreground-on-background boxes 56a–56c, lists the font sizes which are displayed in the foreground-on-background boxes 56a–56c, in horizontal alignment with the respective row of text displaying the font size listed in font size column 58. The font sizes displayed range from 8 pt to 14 pt, which are commonly used font sizes for text display. Alternatively, the font sizes displayed could be any size, depending on the particular application of the invention. The graphical control area 50 could include a control for setting the particular font sizes to be displayed, or for selecting the range of font sizes to be displayed.

Palette display area 60, located at the top of the screen, above graphical presentation display area 40, displays a color palette 64, a background color marking button 70, and a foreground color marking button 72. The functionality of background color marking button 70 and a foreground color marking button 72 will become clear later in the description of the method according to the present invention. Color palette 64 displays 216 Web-Safe colors from which the user can select foreground or background colors. Alternatively, the color palette 64 could be a different set of colors. In the default setting, a left-click of the mouse on a given color selects the color as the foreground color, while a right-click of the mouse on the color selects the color as the background color. An option is to change the mouse-inputs which select colors. A further option is to change the colors comprising the color palette 64.

Color generation area 80 includes foreground color creation area 82 and background color creation area 84 for generating custom colors which are not displayed in color palette 64. Entering the RGB software values into boxes 82a–82c, respectively, and clicking on button color generation button 86 will change the foreground color in the foreground-on-background boxes 56a–56c to the color corresponding to the RGB values entered. Entering the RGB software values into boxes 84a–84c, respectively, and clicking on button color generation button 86 will change the background color in the foreground-on-background boxes 56a–56c to the color corresponding to the RGB values entered.

Figure 4:
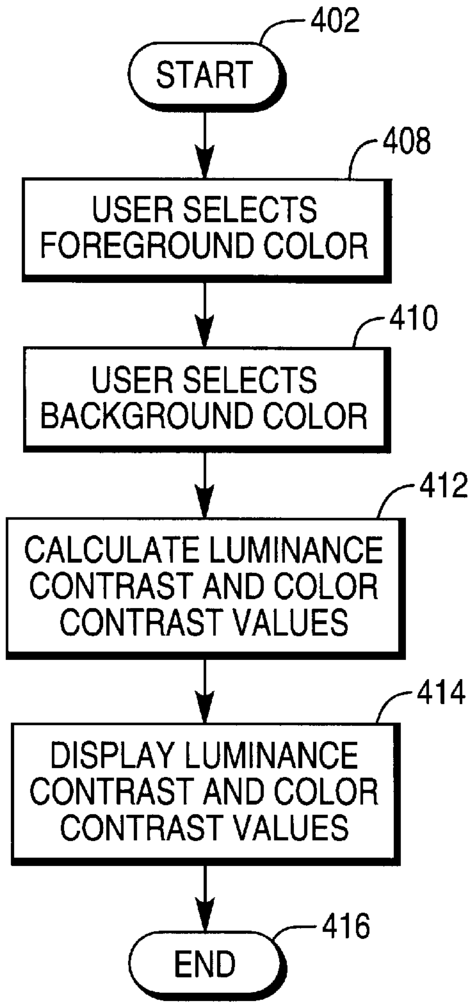
FIG. 4 is a flow chart illustrating a method of evaluating the visual contrast between foreground and background colors, in which the input received is two colors.

Refer now to FIG. 4, illustrating a first method of the present invention. This first method is based upon inputting two colors by a user, one a foreground color and one a background color. The method starts at a starting step 402. At step 408 the user selects a new foreground color. The user can select a foreground color by clicking on a color of the color palette 64 (a left-click of the mouse by the user on a color in the color palette will select the color as the foreground color), by using the color generation area 80 as described herein, or by any alternative means.

At step 410 the user selects a new background color. The user can select a background color by clicking on a color of the color palette 64 (a right-click of the mouse by the user on a color in the color palette will select the color as the background color), by using color generation area 80 as described herein, or by any alternative means.

Steps 408 and 410 can be performed in any order.

At step 412 the visual contrast values are calculated. As described herein, the particular visual contrast parameters calculated are luminance contrast and color contrast. Alternatively, other visual contrast parameters could be calculated.

At step 414 the calculated visual contrast values are displayed in the numerical data display area 80, as described herein. By comparing the visual contrast values with those recommended by various expert sources, such as vision scientists and human factors experts, the GUI designer has scientific guidelines for determining whether a particular combination of foreground and background colors will provide sufficient contrast for readability according to the target population's visual perception.

Upon selection of a foreground color by the user in step 408, the color of the foreground content of foreground-on-background boxes 56*a*–56*c* will immediately change to the foreground color selected, and the data in the numerical data display area 20 will immediately be calculated and displayed according to steps 412 and 414, respectively, as if step 410 had been performed and the previous background color been selected as the new background color.

Upon selection of a background color by the user in step 410, the color of the background of foreground-on-background boxes 56*a*–56*c* will immediately change to the background color selected, and the data in the numerical data display area 20 will immediately be calculated and displayed according to steps 412 and 414, respectively, as if step 408 had been performed and the previous foreground color been selected as the new foreground color.

A second method according to the present invention is based on receiving as input one color, either a foreground color or a background color, and receiving as input a palette of colors. This second method allows the user to select a foreground or background color, and identify background or foreground colors, respectively, whose values for measures of visual contrast are greater than a certain contrast minimum.

For simplicity, this method is described herein only for the case in which the color received as input is a foreground color, and background colors are identified whose values for measures of visual contrast are greater than a certain contrast minimum. The embodiment of the case in which the color received as input is a background color, and foreground colors are identified whose values for measures of visual contrast are greater than a certain contrast minimum should be readily apparent, and indeed can be obtained by substituting "background" for "foreground" and vice versa throughout the description.

Figure 5:
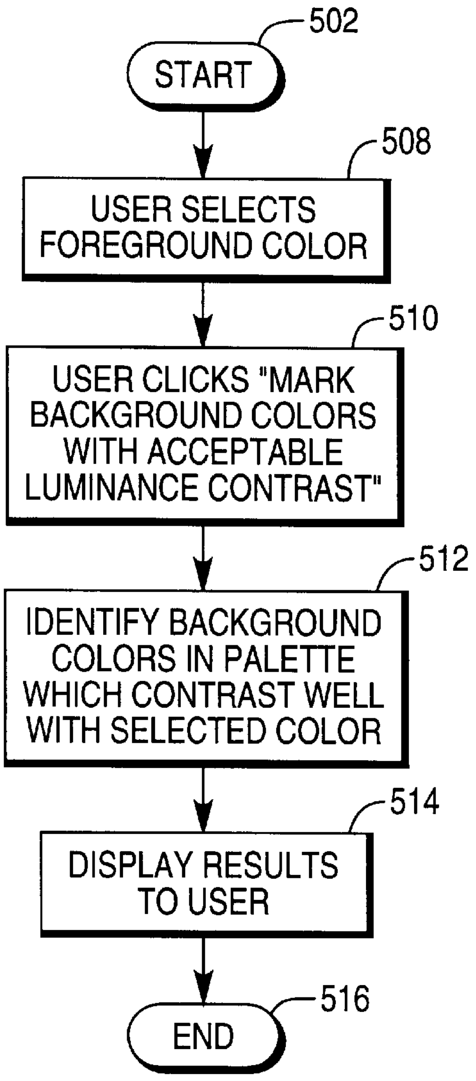
FIG. 5 is a flow chart illustrating a method of evaluating the visual contrast between foreground and background colors, in which the input received is one color and a color palette.

Refer now to FIG. 5, where the method starts at step 502. At step 508 the user selects a new foreground color. The user can select a foreground color by clicking on a color of the color palette 64 (a left-click of the mouse by the user on a color in the color palette will select the color as the foreground color), by using color generation area 80 as described herein, or by any alternative means.

At step 510 the user clicks on background color marking button 70. This inputs the selected foreground color as well as the color palette 74. Values for each of at least one measure of visual contrast, representing the minimum acceptable value for each of the respective measures of visual contrast are also provided as input. The source of these values is not important. They can be fixed and unchangeable, or a means for allowing the user to input these values can be used according to the many methods known in the art of receiving user input.

At step 512 the inputted foreground color is compared to the colors comprising the color palette 74, and at least one color is identified whose values for its measures of visual contrast are greater than the inputted minimum acceptable value for each of the respective measures of visual contrast, if such a color is present in the palette.

At step 514 the colors identified in step 512 are highlighted for the user, or if no colors were identified in step 512 as meeting the defined visual contrast criterion, this fact is displayed to the user using any of the many methods known in the art of displaying messages to the user.

Colors in the color palette 64 are highlighted by marking an "O" or other marker inside the color's box in the color palette 64.

It should now be apparent that a method has been described of providing an objective evaluation of the legibility of color selections for foreground content and background of visual displays, in terms of the presentation of adequate visual contrast for various populations having different visual perception, where the evaluation includes both numerical and graphical components.

It should further be apparent that a method has been described of receiving as input a foreground or background color, and identifying background or foreground colors, respectively, whose visual contrast with the first color is above a certain contrast minimum.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of providing an objective evaluation of the legibility of color selections for foreground content and background of visual displays, in terms of the presentation of adequate visual contrast, comprising the steps of:

(a) receiving as input a foreground color or a background color;

(b) receiving as input a palette of colors;

(c) receiving as input a value for each of at least one measure of visual contrast, representing the minimum acceptable value for each of the respective measures of visual contrast;

(d) comparing the inputted foreground or background color to the colors in the palette of colors;

(e) identifying at least one color in the palette of colors whose values for its measures of visual contrast are greater than the at least one respective minimum acceptable value for measures of visual contrast inputted in step (c), if such a color is present in the palette;

(f) highlighting for the user at least one color in the palette of colors whose values for its measures of visual contrast are greater than the at least one respective inputted minimum acceptable value for measures of visual contrast, identified in step (e), if such a color is present in the palette, or if no such color is present in the palette, providing output indicating there is no color in the palette of colors that has values for its measures of visual contrast greater than the at least one respective inputted minimum acceptable value for measures of visual contrast.

2. The method of claim 1, wherein said step of receiving as input a foreground color or a background color includes the step of receiving said input from the user.

3. The method of claim 1, wherein said step of receiving as input a palette of colors includes the step of receiving the input from a user.

4. The method of claim 1, wherein the step of receiving as input a palette of colors consists of receiving a standard Web-Safe palette of 216 colors.

5. The method of claim 1, wherein said step of receiving as input a value for each of at least one measure of visual contrast, representing the minimum acceptable value for each of the respective measures of visual contrast includes the step of receiving the values for the respective measurements of visual contrast from the user.

6. The method of claim 1, wherein at least one measure of visual contrast between the foreground color and the background color is at least one of luminance contrast, color contrast, and any composite of the two.

* * * * *